A. J. BROWNSCOMBE.
COMB CLEANING ATTACHMENT FOR STRIPPERS OR HARVESTING MACHINES.
APPLICATION FILED JAN. 9, 1903.
915,932.
Patented Mar. 23, 1909.
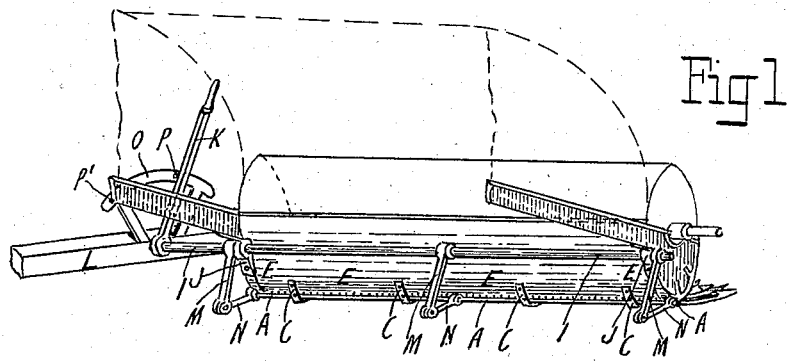
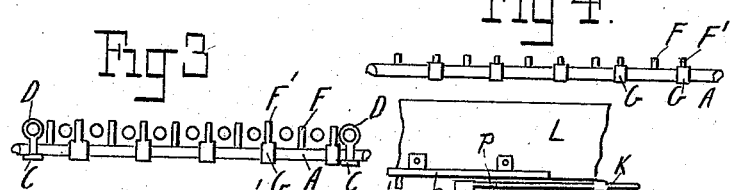
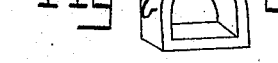
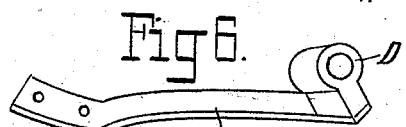
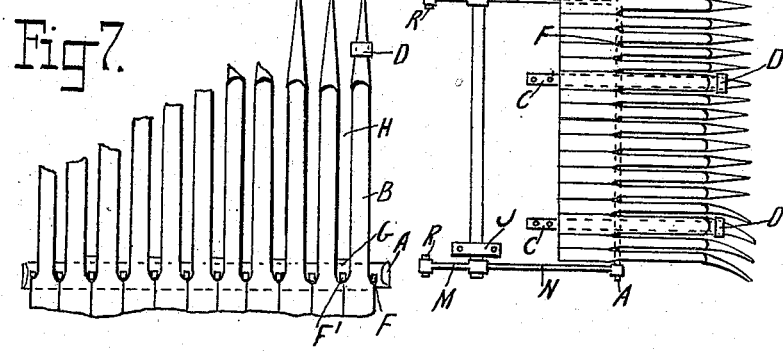
Witnesses
Albert Popkins
Jno. Mister
Inventor
Alfred J. Brownscombe
by Wm. H. Babcock
Attorney
THE NORRIS PETERS CO., WASHINGTON, D. C.

UNITED STATES PATENT OFFICE.

ALFRED JOHN BROWNSCOMBE, OF BECTIVE, NEW SOUTH WALES, AUSTRALIA.

COMB-CLEANING ATTACHMENT FOR STRIPPERS OR HARVESTING-MACHINES.

No. 915,932.　　　　　　Specification of Letters Patent.　　　Patented March 23, 1909.

Application filed January 9, 1903. Serial No. 138,330.

*To all whom it may concern:*

Be it known that I, ALFRED JOHN BROWNSCOMBE, a subject of the King of Great Britain and Ireland, residing at Bective, in the State of New South Wales, Australia, agriculturist, have invented certain new and useful Improvements in Comb-Cleaning Attachments for Strippers or Harvesting-Machines; and I do hereby declare the following to be a full, clear, and exact description of the inventon, such as will enable others skilled in the art to which it appertains to make and use the same.

This invention relates to means for cleaning harvester combs and consists in the construction and combination of parts hereinafter set forth and claimed.

In the accompanying drawings Figure 1 represents a perspective view of the devices embodying my invention. Fig. 2 represents a plan view of a forwardly presented harvester comb provided with cleaning devices embodying my invention, bearing brackets and a part of the harvester frame being also shown. Fig. 3 represents a front view of a part of the comb, a part of the cleaning bar and the cleaning pins and two of the supporting arms, the comb teeth being indicated by circles. Fig. 4 represents a detail view of a part of said bar showing the pins shorter than in Fig. 3. Fig. 5 represents an enlarged perspective view of one of the movable collars on said rod. Fig. 6 represents an enlarged detail view of one of the comb-supporting arms and Fig. 7 represents an enlarged plan view of a part of said comb and the corresponding part of said cleaning bar.

A designates the cleaning bar and B the comb which is arranged above it, said comb, as shown in Figs. 1, 3 and 7, resting on arms C which are suspended from the comb by means of the thimbles D at one end and bolted to the drum E at the other end as indicated in Figs. 1, 2 and 6. These arms may vary in number as found convenient, four being shown in Fig. 2, where their position is indicated by dotted lines.

The cleaning bar A is provided with cleaning pins, which extend up through the intervals H between the comb-teeth. These cleaning pins consist of two sets F and F', arranged alternately, the pins F being fixed on the bar A whereas each pin F' is fixed on a collar G, which is loose on bar A but has one face flattened to fit a similarly flattened face of said bar. The collars G are not necessary, though convenient, for all of the pins may be fixed on the bar A. The length of these pins F F' may vary considerably. If one of the pins F' be broken or bent, its collar G may be filed away or otherwise removed without harming bar A.

Each arm C has an eye D formed on its upper side at its outer end, receiving the point of one of the teeth of comb B. The comb rests on the flat part of said arms and is also supported by said eyes, which also prevent the vertical, lateral or other displacement of the said comb. Several rods N extend downward and rearward at intervals from various points of bar A to similarly located arms M of a rock-shaft I, mounted in bearings J which are attached to a movable frame. An arm or hand lever K, fast at its lower end on said rock-shaft, is used for rocking the latter and may be limited in its position by the usual quadrant raised on a side bar L of the fixed main frame, having pins P P', or other suitable stops. The proximate ends of arms M and rods N are pivotally connected in each instance at R. When the lever K is drawn backward, the cleaning bar A is moved forward by the action of the rock-shaft I and rods M N, and the pins F F' clean the spaces H between the comb-teeth. By reversing said movement of the lever the bar A pins F F' and parts M N are all restored to their first position.

Having thus described my invention, what I claim as new and desire to secure by Letters Patent is:

1. In combination with a harvester-comb, a cleaning bar arranged under the comb-teeth and provided with pins which extend upward between the comb-teeth and mechanism for moving the said bar and pins forward to clear the spaces between the teeth substantially as set forth.

2. In combination with a harvester-comb a cleaning bar provided with loose collars which carry pins extending upward between the comb-teeth, and mechanism for moving said bar and pins forward to clean the comb-teeth, the said bar and collars being relatively shaped to prevent the turning of said collars on said bar substantially as set forth.

3. In combination with a harvester-comb and means for cleaning the same, a series of fixed comb-supporting bars provided with eyes which receive the comb-teeth and hold the comb in place substantially as set forth.

4. In combination with a harvester-comb, a movable cleaning bar provided with pins which enter between the comb-teeth, a series of rods extending rearward therefrom a rock-shaft having a series of arms pivotally connected to said rods and a lever or arm on said rock-shaft for rocking the same forward to clean the comb teeth or backward to replace said bar and pins in their normal position substantially as set forth.

In testimony whereof I have hereunto affixed my signature in presence of two witnesses.

ALFRED JOHN BROWNSCOMBE.

Witnesses:
JOHN J. STONE,
C. O. B. MOYNAN.